March 21, 1939.  A. GRANTHAM  2,151,594
TAPPING MACHINE
Filed Dec. 3, 1936   2 Sheets-Sheet 1
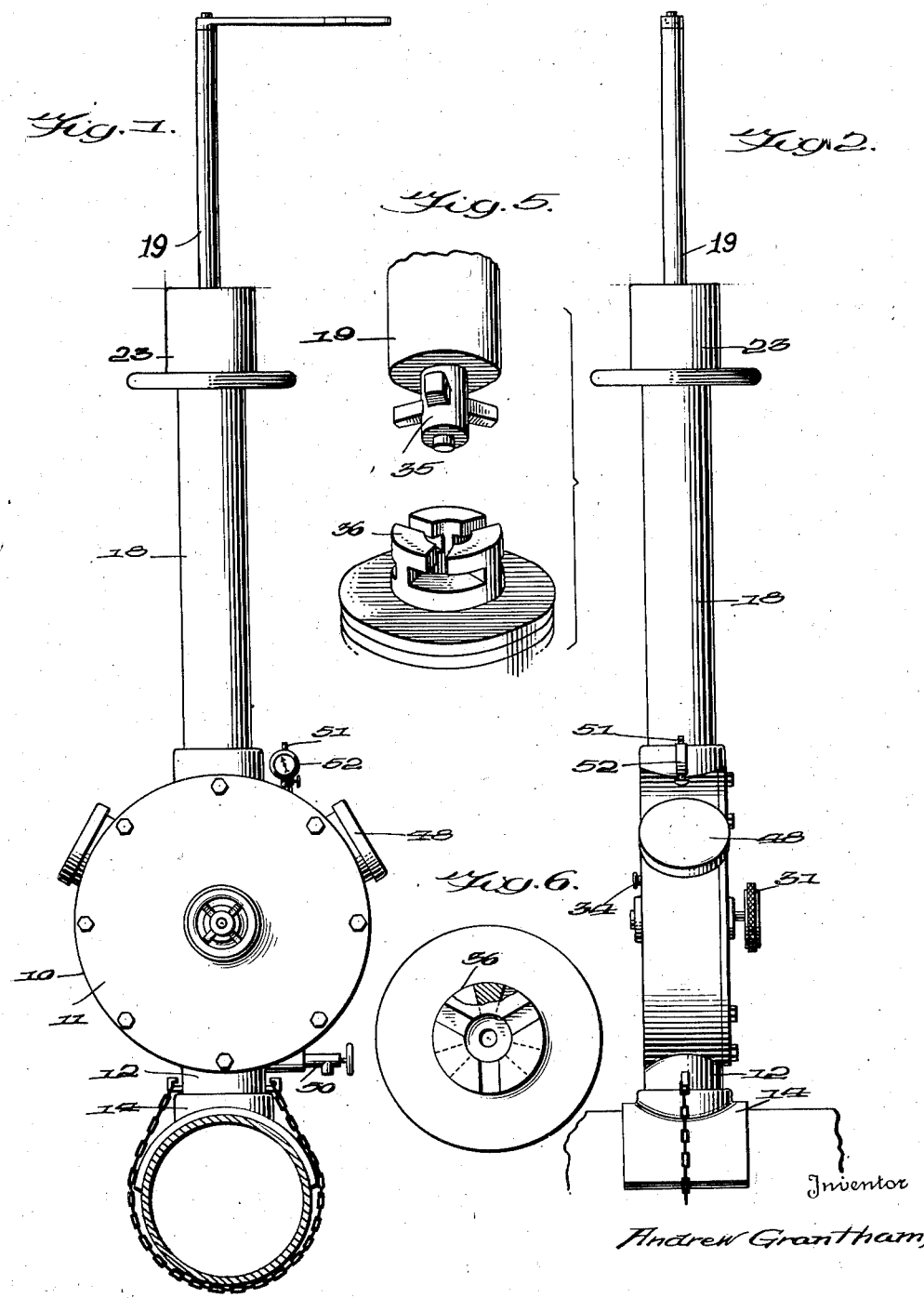

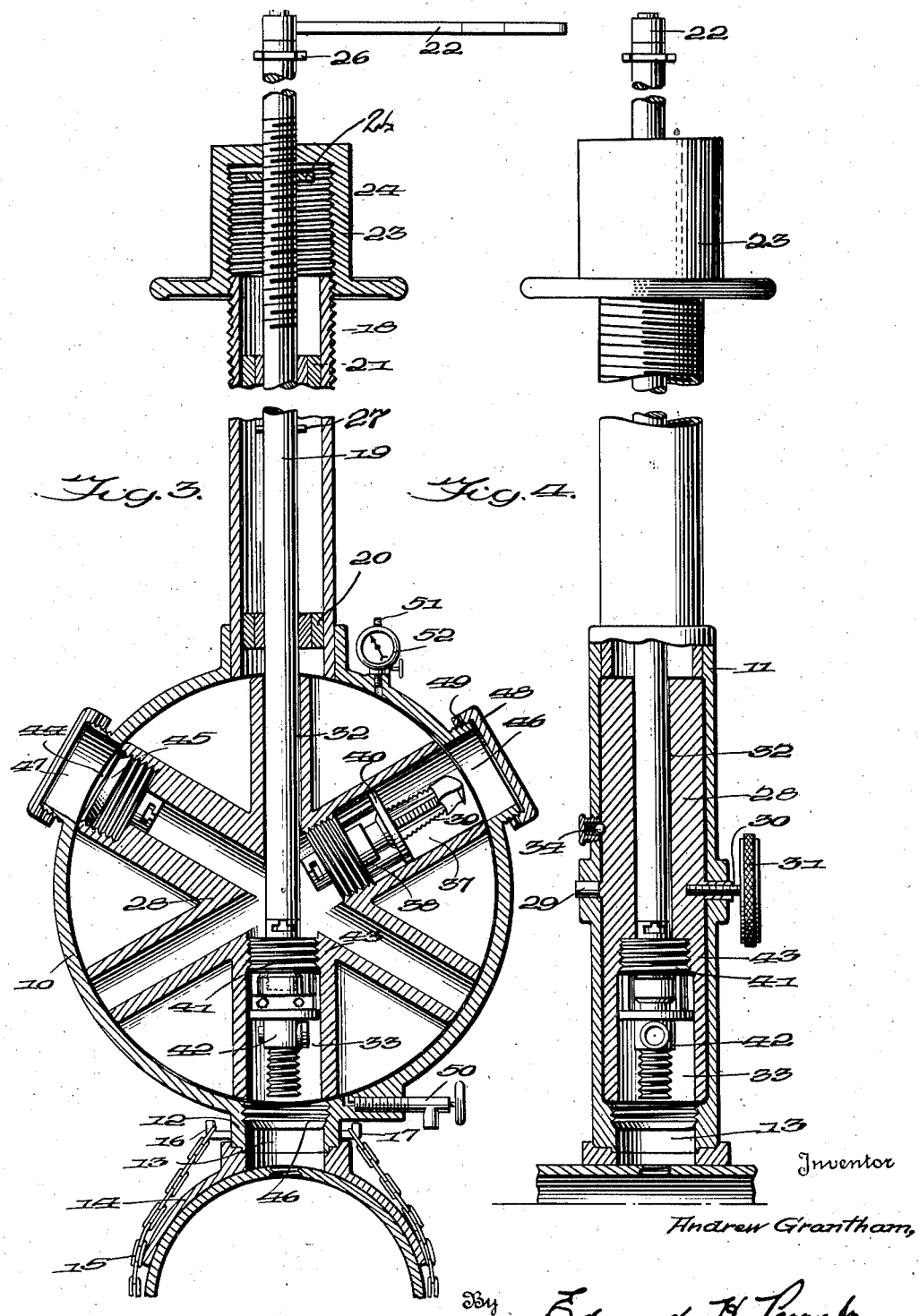

Patented Mar. 21, 1939

2,151,594

UNITED STATES PATENT OFFICE 2,151,594

TAPPING MACHINE

Andrew Grantham, White Plains, N. Y.

Application December 3, 1936, Serial No. 114,069

17 Claims. (Cl. 77—39)

This invention is directed to an improved machine for applying corporation fittings or other pipe connections to water and gas mains.

As in the case of certain prior machines the general purpose of the invention is to provide a machine which is adapted to house a tap drill and a fitting, and which may serve to tap a main and apply a fitting thereto while the main is in operation.

A particular object of the invention is to provide a machine of improved construction for operating under line pressure conditions which will allow a drill, fitting, and/or other instrumentalities to be selected and manipulated with greater facility and which will hold the same in proper position during their presentation to the main.

A further object of the invention is to provide a tapping machine which when the main is tapped will permit instrumentalities to be removed from the machine for examination and/or replacement without the escape of line pressure. Thus, for example, if after tapping the main with the machine trouble is experienced in the insertion of the fitting, the proposed arrangement permits the fitting to be removed from the machine and a new fitting installed for insertion in the main without necessitating the removal of the machine itself.

Still another object of the invention is to provide a tapping machine with an emergency valve which may be manipulated in like manner to the other instrumentalities of the machine to cut off line pressure so that access may be had to the interior of the machine, and which valve may similarly be withdrawn to permit further operations to be performed after the machine has again been closed.

Another object of the invention is to provide a machine of the type indicated through which a fluid operating pressure may be applied to counter-balance the pressure in the main. Thus, in the case of tapping a water main it will be possible to apply air pressure so that the interior of the machine will be maintained dry during operation. It is also proposed to provide a vent in the machine so that fluid pressure, whether gas or liquid, may be released as desired at any time either before or at the time the operation is completed, and the machine is to be removed from the main.

Still another object of the invention is to provide a movable support in the machine adapted to carry a plurality of instrumentalities to be used at different stages in the operation of the machine, and which support may be manipulated to selectively bring the different instrumentalities into position to be acted upon by a common operating spindle. It is further proposed to provide means for detachably securing the instrumentalities in fixed position on the supporting member in such manner that they may be secured or released through manipulation of the operating spindle.

The nature of the invention and the above and other objects of the invention will be more fully understood by reference to the following detailed description of an illustrative embodiment of the invention disclosed in the accompanying drawings. In such drawings:

Fig. 1 is a side elevation of the machine illustrating the invention;

Fig. 2 is an end elevation corresponding to Fig. 1;

Fig. 3 is a sectional elevation corresponding to Fig. 1;

Fig. 4 is an elevation partly in section corresponding to Fig. 2, and taken at right angles to Fig. 3;

Fig. 5 is a perspective view, somewhat enlarged of the details shown in Fig. 3; and, Fig. 6 is a top plan view of the lower element shown in Fig. 5.

In the drawings the machine comprises a main casing 10 which for reasons that will become apparent is preferably in the form of a relatively narrow cylindrical drum. Such casing may be provided with a removable side wall 11 for cleaning and other purposes, the same being firmly secured in position by bolts or other means to render the casing fluid-tight. Projecting from the periphery of the casing is a short foot 12 having therein a work opening 13 communicating with the interior of the casing and extending diametrically thereof.

To secure the machine in position on a main a series of arcuate shoes 14 are provided to conform to mains of different diameter, the same being fitted to the end of the foot 12 in sealing engagement therewith. An aperture will be provided in the shoe registering with the work opening 13. Gaskets (not shown) may be inserted between the shoe and the main, and between the shoe and the machine foot, to insure sealed connections. The casing may be held in position on the main through the provision of chain 15, and lugs 16 and 17 on the foot.

Diametrically opposite the work opening 13 is an extension of the casing in the form of a tube 18 adapted to support an operating spindle 19 for reciprocatory and rotative movement relative to the main casing 10. Aligning and supporting packing bearings 20 and 21 may be provided in the tube to engage the spindle. These packing bearings prevent leakage of pressure when the cap 23 is removed. The spindle above the upper end extremity of the tube may be provided with a ratchet handle 22, or other suitable means for rotating the same.

It will be understood that the spindle is adapted to move longitudinally through the tube relative to the work opening 13. The same may be positively actuated by means of a wheeled-feed yoke, or cap, 23 fitted to the upper end of tube 18 and screw threaded for adjustment thereon. The spindle 19 will be provided with a fixed collar 24 which will be engaged by the feed yoke as the latter is adjusted, so as to urge the spindle downwardly. An external stop in the form of a collar or pin 26 may be provided on the spindle to limit its downward movement, and graduations may be provided on the spindle as indicated to show the position of the spindle relative to the main at any stage of operation. To limit the upward movement of the spindle a stop 27 may be provided within the tube which, upon removal of cap 23 and raising of the spindle will engage with the supporting packing bearing 21.

Mounted in the main casing 10 for movement in a plane transverse to the axis of the spindle is an instrumentality supporting member, generally designated by the numeral 28. The same here takes the form of a rotor rotatably supported on stub shafts 29 and 30 in axially-positioned journals in the opposing side walls of the casing. A knob 31 is provided to manipulate the rotor. To support a plurality of instrumentalities, the rotor is provided with a series of angularly arranged diametric bores. Such bores are preferably made the full width of the casing. The rotor need not be solid, but may be made in skeleton form so as to appear, as shown in Fig. 3, as a series of intersecting tubes. The upper portion 32 of the various bores will preferably be sufficiently narrow to snugly fit and to provide a bearing guide for spindle 19. The lower portion 33 of the bore to one side of the axis of the rotor will be sufficiently large to accommodate the instrumentalities to be housed therein.

Assuming the spindle is raised so that its lower end is above the main casing, the rotor 28 may be turned to bring any of the various bores into alignment with the spindle 19 and work opening 13, and thereafter the spindle may be lowered into the particular bore so positioned. To secure the rotor against undesired rotation, a spring pressed ball or latch 34 may be provided in the casing, as shown in Fig. 4, engageable with a series of depressions provided in the rotor. Such arrangement insures exact alignment between the spindle and the particular bore selected.

Supported in the lower portions of the bores are adaptors or holders having upper end portions adapted to be detachably engaged with the lower end of spindle 19. The multiple bayonet type of joint comprising coacting parts 35 and 36, shown in Fig. 5, is deemed particularly desirable inasmuch as it permits a holder to be rotated in either direction by spindle 19, and also raised and lowered thereby, without accidental detachment.

Referring to Fig. 3, bore 37 of the rotor carries a holder 38 supporting a tap drill 39. In order to prevent wobbling of the drill when in use the holder is provided with an aligning ring 40 which bears against the bore. A substantially similar holder 41 is provided in bore 33 which will support a threaded corporation fitting 42 which is to be inserted in the main. The fitting may be loosely screw threaded in holder 41 so that after the fitting has been inserted into the main the holder may be readily released therefrom by manipulation of the spindle. Also, as particularly shown in Fig. 3, clamping means may be provided on the holder permitting the fitting to be positively held and rotated in either direction by the holder, in which case the fitting and holder are connected together or separated externally of the casing.

Assuming that the main has to be tapped, or retapped the rotor will be manipulated to bring bore 47 in alignment with the operating spindle. The spindle will then be lowered until connection is effected with drill holder 38. The spindle will then be rotated to lower the drill in its bore, and projects the same through the work opening 13. After the tapping has been completed the spindle will be raised to return drill 39 to its retracted position in bore 37. The spindle will then be further raised out of the main casing 10, and the rotor will then be turned to bring bore 33 into alignment with the spindle. The spindle will then be manipulated as before to bring the screw-threaded fitting 42 into the tap in the pipe.

It will be noted that means are provided for detachably supporting the instrumentalitiy holders in fixed position in the respective bores except when manipulated by the spindle. Such means, in the present instance, comprises complementary threading 43 on the instrumentality holders, and the upper parts of the large bore portions.

At times difficulty may be experienced with the tap drill, or in inserting the fitting in the main. Provision is made whereby the different instrumentalities may be removed and replaced in the casing without necessitating the removal of the machine from the main. A further bore 44 is provided in the rotor 28 housing a plug valve 45. Such valve upon being brought in alignment with the spindle may be lowered thereby and screw-threaded into a seat 46 of work opening 13 in the casing foot 12. When the valve is so positioned the casing will be cut off from the line pressure in the main. One or more inspection openings such as 46 and 47 may be provided in the periphery of the casing, giving access to the bores other than the one then in alignment with the spindle and work opening, and permitting the manual removal of the instrumentalities in the bore. The angular position of the inspection openings 46 and 47 in the casing in relation to the work opening 13 will preferably correspond to the angular relation between the different bores in rotor 28, so that when one of the bores is aligned with the work opening the other bores will register with the inspection openings. The inspection openings will be provided with tight fitting threaded caps 48. Such caps may be provided with a series of apertures 49 in their flange adapted after the cap has been partially unscrewed to allow a gradual venting of any pressure existing in the casing. In this connection, however, it is desirable to provide a valve vent 50 at a suitable point in the casing which will normally be employed to exhaust pressure from the casing before one of the inspection openings is uncovered, or before the machine is removed from the main.

In the form of the invention shown it will be observed that three bores are provided in the rotor, one houses tap drill 39, the second housing a corporation fitting 42, and the third houses the emergency plug valve 45. These will preferably be equally spaced and arranged at 120° from one another. The inspection openings 46 and 47 will similarly be located in the casing in relation to the work opening 13. It will be understood that only one work opening need be provided for use in removing either the drill or the pipe fitting from their respective bores. This will necessitate a slight modification of the emergency valve 45 and its seat in the foot 12, so that when such valve is in position to close work opening 13, the rotor can be turned to selectively bring the other bores into alignment with the work opening. To prevent the escape of fluid from the main into the machine casing, as is desirable when working on water or other liquid mains, arrangement is made to admit air pressure into the casing. A valved inlet 51 is shown in Fig. 3 through which air may be pumped. It is desirable to provide a gauge 52 so that it can be determined when sufficient pressure has been applied to the casing to counterbalance the pressure in the main.

With the arrangement as described, a main may be tapped, or retapped, and a fitting inserted. In the event difficulty is encountered the casing may be closed off through the emergency valve, and either or both of the drill and fitting removed from the casing without release of pressure from the main. It will be understood that the arrangement is not only adapted to insert a fitting in a new tap, but also may be employed to remove an old fitting and replace the same by a new fitting. Since the instrumentality holders in the different bores are removable, particularly by reason of the inspection openings in the casing, the construction is well adapted for this purpose. An empty threaded or clamping holder generally similar to 41 will be engaged with the old fitting in the pipe. This may be done by applying such empty holder to the old fitting in the main, and then lowering the work opening of the machine over such holder with an empty bore aligned with the work opening. The spindle may then be lowered to engage the holder and unscrew the same. After the old fitting is raised in the bore and the spindle is detached the rotor may be turned to bring a new fitting which sits in one of the other bores into registry with the work opening, and the new fitting will then be inserted in the pipe in the manner heretofore described. Again, an empty holder adapted to grip an old fitting may be preliminarily inserted in one of the bores of the rotor, and brought into engagement with the fitting by means of the spindle. The rest of the procedure will be the same as just described.

While the machine is primarily adapted for tapping and retapping mains, inserting fittings in taps, and removing fittings from mains and replacing same with new fittings, the machine may be employed for similar purposes in connection with fluid pressure containers and the like where fittings must be inserted under pressure conditions. It is only necessary in this connection to replace shoe 14 on the casing foot 12 with another shoe of proper shape for the particular work desired.

It will be evident to those skilled in the art that the various main and collateral features as herein described may be embodied in a variety of forms and sizes. The scope of the invention is therefore to be determined from the scope of the appended claims rather than from the details of the particular embodiment here illustrated and described.

I claim:

1. A pipe tapping machine comprising a sealed casing, an opening in the periphery of the casing, a spindle supporting member at the side of the casing opposite said opening, an operating spindle extending diametrically of the casing in alignment with said opening supported by said spindle supporting member for lengthwise and rotating movement, a rotor in the casing rotatable about an axis transverse to the spindle, means for rotating said rotor, a plurality of intersecting diametrical bores in the rotor adapted to be selectively brought into alignment with the spindle and casing opening upon rotation of the rotor, the respective bores having a restricted portion adapted to closely embrace and support the operating spindle and having a portion of larger diameter at the casing opening end of the bore adapted to support an instrumentality for engagement by the spindle.

2. A pipe tapping machine comprising a sealed cylindrical casing, an opening in the periphery of the casing, a longitudinally reciprocable and rotatable operating spindle supported by the casing and extending diametrically of the casing in alignment with said opening, a rotor in the casing rotatable about an axis transverse to the spindle, means for rotating said rotor, and a plurality of intersecting diametrical instrumentality-holding bores in the rotor adapted upon rotation of the rotor to be selectively brought into alignment with the spindle and casing opening.

3. A pipe tapping machine comprising a sealed cylindrical casing, an opening in the periphery of the casing, a longitudinally reciprocable and rotatable operating spindle supported by the casing and extending diametrically of the casing in alignment with said opening, a rotor in the casing rotatable about an axis transverse to the spindle, means for rotating said rotor, a plurality of intersecting diametrical bores in the rotor, a tap drill supported for movement in one of said bores, a holder for pipe fittings supported for movement in another of the bores, and means for detachably connecting said drill and holder to the spindle.

4. A pipe tapping machine comprising a sealed cylindrical casing, an opening in the periphery of the casing, a longitudinally reciprocable and rotatable operating spindle supported by the casing and extending diametrically of the casing in alignment with said opening, a rotor in the casing rotatable about an axis transverse to the spindle, means for rotating said rotor, a plurality of intersecting diametrical bores in the rotor, a tap drill supported for movement in one of said bores, a holder for pipe fittings supported for movement in another of said bores, a valve body supported in a further of said bores for closing the casing opening, and means on the elements in the respective bores for detachably connecting the same to the operating spindle.

5. A pipe tapping machine comprising a sealed cylindrical casing, an opening in the periphery of the casing, a longitudinally reciprocable and rotatable operating spindle supported by the casing and extending diametrically of the casing in alignment with said opening, a common instrumentality supporting member in the casing movably mounted to selectively bring the different instrumentalities into alignment with the spindle and casing opening, means for moving said member, and an emergency plug for closing the casing opening carried by said common supporting member.

6. A pipe tapping machine comprising a sealed cylindrical casing, an opening in the periphery of the casing, a longitudinally reciprocable and rotatable operating spindle supported by the casing and extending diametrically of the casing in alignment with said opening, a common instrumentality supporting member in the casing movably mounted to selectively bring the different instrumentalities into alignment with the spindle and casing opening, means for moving said member, an emergency plug carried by the common supporting member, and a seat for said plug in the casing opening.

7. A pipe tapping machine comprising a sealed cylindrical casing, an opening in the periphery of the casing, a longitudinally reciprocable and rotatable operating spindle supported by the casing and extending diametrically of the casing in alignment with said opening, a common instrumentality supporting member in the casing movably mounted to selectively bring the different instrumentalities into alignment with the spindle and casing opening, means for moving said member, an emergency plug carried by the common supporting member, a seat for said plug in the casing opening, and means for locking the plug in the casing opening.

8. A pipe tapping machine comprising a sealed casing, a longitudinally reciprocable and rotatable operating spindle supported by the casing, an instrumentality supporting member movably mounted in the casing to selectively bring different instrumentalities carried thereby into alignment with the spindle, means for moving said member, an opening in the casing aligned with the spindle, and a further opening in the casing provided with a closure member giving access to an instrumentality carried by the supporting member.

9. A pipe tapping machine comprising a sealed casing, a longitudinally reciprocable and rotatable operating spindle supported by the casing, an instrumentality supporting member movable in the casing to bring different instrumentalities into alignment with said operating spindle, means for moving said member, an opening in the casing aligned with said spindle, a cutoff plug for said opening carried by the supporting member, and a further opening provided with a closure member positioned in the casing to give access to another instrumentality carried by the supporting member when the first case opening is closed by the emergency plug.

10. A pipe tapping machine comprising a sealed casing, an opening in the periphery of the casing, a longitudinally reciprocable and rotatable operating spindle supported by the casing and extending diametrically of the casing in alignment with said opening, a rotatable member in the casing rotatable about an axis transverse to the spindle, means for rotating said rotor, a plurality of radially extending instrumentality supports arranged about the rotatable member adapted upon rotation of the member to be selectively brought into alignment with the spindle and casing opening, and at least one further opening in the casing provided with a closure member adapted to give access to instrumentalities carried by the rotor when another of the instrumentalities is supported by the rotor in alignment with the spindle and first casing opening.

11. A pipe tapping machine comprising a sealed casing, an opening in the periphery of the casing, a longitudinally reciprocable and rotatable operating spindle supported by the casing and extending diametrically of the casing in alignment with said opening, a rotor in the casing rotatable about an axis transverse to the spindle, means for rotating said rotor, a plurality of angularly related radially extending bores adapted to support instrumentalities in the rotor, and adapted through manipulation of the rotor to be selectively brought into alignment with the spindle and casing opening, and a closure-provided opening positioned in the casing and spaced from the first opening at an angle equal to the angular spacing between the bores in the rotor.

12. A pipe tapping machine comprising a sealed casing, an opening in the periphery of the casing, a longitudinally reciprocable and rotatable operating spindle supported by the casing and extending diametrically of the casing in alignment with said opening, a rotor in the casing rotatable about an axis transverse to the spindle, means for rotating said rotor, a plurality of angularly related radially extending bores adapted to support instrumentalities in the rotor, and adapted through manipulation of the rotor to be selectively brought into alignment with the spindle and casing opening, and a plurality of closure-provided openings in the casing having an angular relation to the first opening corresponding to the angle between the different bores in the rotor, said openings being adapted to give access to instrumentalities carried by the rotary member when another of the instrumentalities is in alignment with the spindle and first casing opening.

13. A pipe tapping machine comprising a sealed casing, a work opening in the casing adapted to be disposed against a pipe, a reciprocable and rotatable operating spindle extending into the casing and aligned with said opening, a member in the casing having means for supporting a plurality of instrumentalities, said member being movable to selectively bring the instrumentalities into alignment with the spindle and work opening, means for moving said member, and means other than said work opening for introducing fluid pressure into the casing.

14. A pipe tapping machine comprising a sealed casing, a work opening in the casing adapted to be disposed against a pipe, a reciprocable and rotatable operating spindle extending into the casing and aligned with said opening, a member in the casing having means for supporting a plurality of instrumentalities, said member being movable to selectively bring the instrumentalities into alignment with the spindle and work opening, means for moving said member, means other than said work opening for introducing fluid pressure into the casing, and means for venting the casing.

15. A pipe tapping machine comprising a sealed casing, an opening in the periphery of the casing, a longitudinally reciprocable and rotatable operating spindle supported by the casing and extending diametrically of the casing in alignment with said opening, a rotor in the casing rotatable about an axis transverse to the spindle, means for rotating said rotor, a plurality of intersecting diametrical bores in the rotor adapted to be selectively brought into alignment with the spindle and casing opening upon rotation of the rotor, the respective bores having a restricted portion adapted to closely embrace and support the operating spindle and having a portion of larger diameter at the casing opening end of the bore adapted to support an instrumentality for engagement by the spindle, and locking means in the portions of the bores of larger diameter for supporting instrumentalities therein and operative upon manipulation of the instrumentalities by the operating spindle to release and to engage the instrumentalities.

16. A pipe tapping machine comprising a sealed casing, an opening in the periphery of the casing, a longitudinally reciprocable and rotatable operating spindle supported by the casing and extending diametrically of the casing in alignment with said opening, a rotor in the casing rotatable about an axis transverse to the spindle, means for rotating said rotor, a plurality of intersecting diametrical bores in the rotor adapted to be selectively brought into alignment with the spindle and casing opening upon rotation of the rotor, the respective bores having a restricted portion adapted to closely embrace and support the operating spindle and having a portion of larger diameter at the casing opening end of the bore, instrumentality holders slidable in the bores, and complementary threads on the holders and in the portions of the bores of larger diameter adapted through manipulation of the holders by the spindle to secure the holders in the bores.

17. A pipe tapping machine comprising a sealed casing, an opening in the periphery of the casing, a longitudinally reciprocable and rotatable operating spindle supported by the casing and extending diametrically of the casing in alignment with said opening, a movable supporting member in the casing, means for moving said member, a plurality of bores in said member arranged to be selectively brought into alignment with the spindle and casing opening by movement of said supporting member, instrumentality holders slidable in the bores, and threads on the holders and coacting threads extending for a portion of the length of the bores adapted through manipulation of the holders by the spindle to secure the holders in the bores, and guiding means acting in the portions of the bores beyond the threaded portions and adapted to maintain the holders in alignment in their respective bores.

ANDREW GRANTHAM.